June 3, 1930.  L. W. SHUTTS  1,761,940
OIL FILTERING MEANS
Filed May 7, 1928
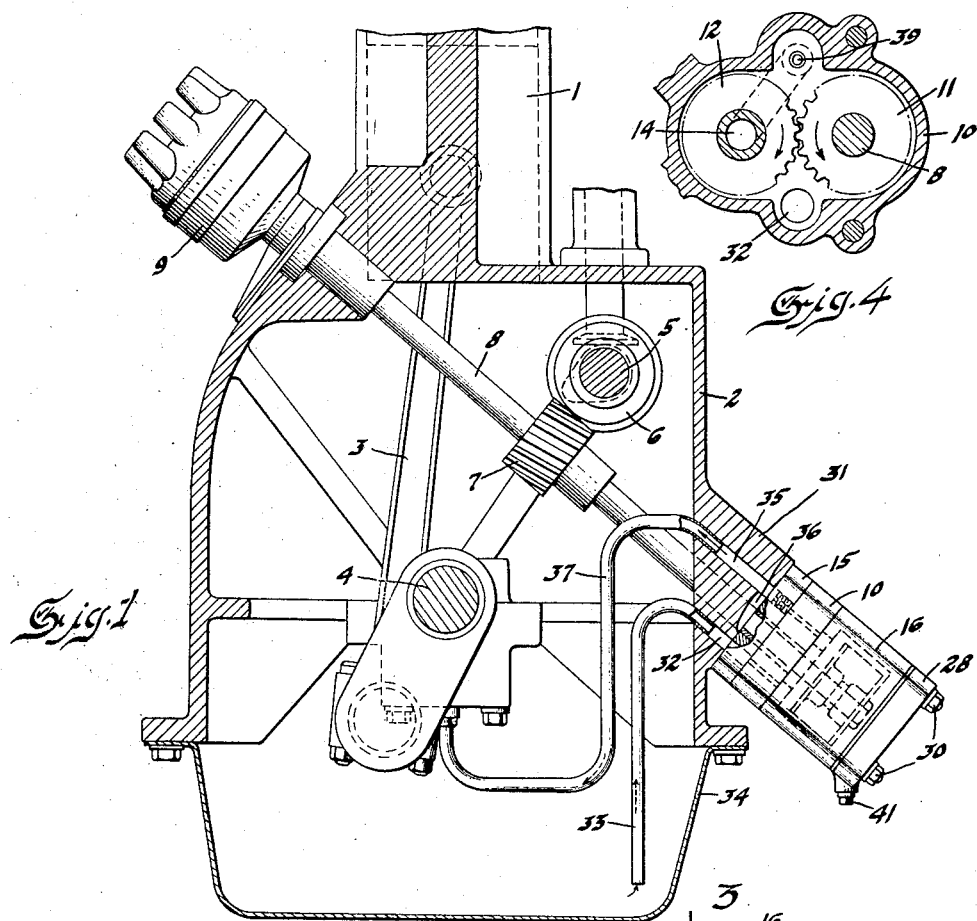
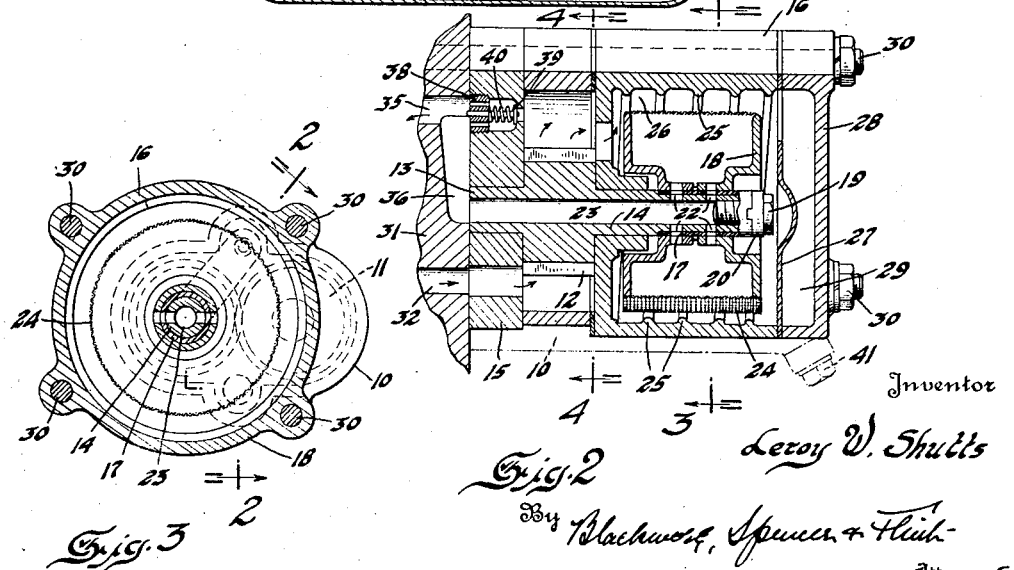
Inventor
Leroy W. Shutts Patented June 3, 1930

1,761,940

UNITED STATES PATENT OFFICE

LEROY W. SHUTTS, OF DETROIT, MICHIGAN, ASSIGNOR TO GENERAL MOTORS RESEARCH CORPORATION, OF DETROIT, MICHIGAN, A CORPORATION OF DELAWARE

OIL-FILTERING MEANS

Application filed May 7, 1928. Serial No. 275,816.

This invention relates to fluid pressure systems and more particularly to filters for separating dirt and foreign material from the liquid in the pressure system. The invention is especially adapted for use with the pressure feed lubricating systems for internal combustion engines, and will be so described herein.

It is an object of the invention to provide a device that will be simple and economical in manufacture, efficient in operation, require little or no attention in use, and which will be unlikely to get out of order.

Another object of the invention is to provide a rotary strainer screen in a chamber on the pressure side of the pump that will prevent dirt from reaching the bearings to be lubricated and which, by reason of its rotation, will cause a swirling action of the liquid in the chamber whereby the dirt and other foreign particles of a greater specific gravity than the liquid will tend to move outward under centrifugal action whereby the screen will remain open and clean for the free flow of liquid therethrough.

A further object of the invention is to provide a helical groove in the wall of the chamber, in which particles thrown outward against the wall may slowly scrub around and move toward the end of the chamber and there fall into a dead space or settling chamber so as to be completely removed from the circulating system.

The above and other objects will be apparent from the following specification, taken in connection with the accompanying drawing showing a preferred embodiment of the invention of which Figure 1 is a transverse sectional view of an internal combustion engine of one type, embodying the present subject matter.

Figure 2 is a sectional view of the pump and filter mechanism.

Figure 3 is a transverse sectional view taken on line 3—3 of Figure 2 and Figure 4 is a transverse sectional view taken on line 4—4 of Figure 2.

Referring to the accompanying drawing the numeral 1 indicates an engine cylinder on the crankcase 2, and the reference character 3 indicates a connecting rod for imparting the force of explosions received by a reciprocating piston in the cylinder to the engine crankshaft 4. Suitable timing gear mechanism connects the crankshaft 4 with a camshaft 5 for controlling the operation of the engine valves, the camshaft also being provided with a gear 6 meshing with a gear 7 to rotate the shaft 8 which drives an ignition distributor 9 at its upper end and an oil pump at its lower end.

The oil pump which, in this instance, is of the gear type comprises a housing or casing 10 enclosing a gear 11 fixed on the shaft 8 and idler gear 12 having hollow shaft extensions 13 and 14 bearing respectively in a plate 15 and end wall of a chambered housing 16. The shaft extension 14 projects into the chamber provided by the housing 16 and has mounted thereon a sleeve 17 carrying a pair of flanged plates or disks 18, the sleeve being held in place by screw bolt or stud 19 threaded in the end of the shaft and being keyed for rotation with the shaft by a projection or lug on the washer 20 that extends within aligned notches in the ends of the sleeve and shaft. Holes or openings 22 in the flanges of the disks 18, sleeve 17 and shaft extension 14, provide for communication between the bore or passageway 23 of the hollow shaft of the idler gear 12, and the chamber of the housing 16, and a strainer screen 24, preferably of wire or cloth fabric, extends across the space between and is secured to the peripheral edges of the disks 18. Integrally formed on the inner surface of the wall of the chambered housing 16 is a helical bead or projection 25, the spaces between succeeding convolutions of the bead constituting a helical groove 26 that terminates at the end of the housing adjacent an opening in a plate 27 held between the end of the housing and a closure cap or cover 28, the opening leading into a well or sediment chamber 29 provided by the space between the plate and cap.

Long bolts or studs 30 serve to mount the cap 28, chambered housing 16, gear case 10 and plate 15, on a boss or projection 31 formed on the side wall of the crankcase 2. A passageway 32 in the boss 31 leading to the suction side of the pump is connected with an intake pipe or conduit 33 projecting into the oil supply in the oil pan 34, while a passageway 35 in the boss 31, communicating through a passageway 36 with the bore 23, is connected with a delivery line or conduit 37 leading to the bearing or bearings to be lubricated. A by-pass 38 normally closed by a valve 39, held on its seat by a spring 40, provides for direct communication between the pressure side of the pump and the passageway 35, and is a safety factor in the event the strainer screen becomes clogged, as for instance when the oil has such a low temperature that it tends to congeal and close the perforations in the screen.

During engine operation the rotation of the gear pump and with it the strainer screen 24 causes oil to be drawn from the pan 34 through conduit 33 to the suction side of the pump, the pressure side of the pump delivering it under pressure to the screen chamber where it is sent into a swirling motion by rotation of the screen. The oil swirling around the chamber and having a velocity somewhat less than the actual velocity of the screen surface causes a centrifugal action on the dirt particles suspended in the oil, which throws them outward against the surface of the wall of the chamber where they slowly scrub around and follow the helical groove 26 to the opening in the end plate 27 and then fall into the dead space or eddy and settle to the bottom of the sediment well 29. A drain plug 41 may be provided for cleaning out the sediment after certain intervals of use. Thus it will be seen that centrifugal force and the relative velocity between the screen and the particles in the oil is relied upon to obtain the filtering action. It has been found that particles much smaller than the openings in the screen are removed from the oil, and this is attributed to the velocity effect which, due to the tangential line of attack, reduces the effective area of the opening of the screen mesh.

The oil in the centrifugal chamber being under pressure, passes through the screen then into the passageway 23 in the hollow shaft and on to the delivery line leading to the engine bearings. Since the spring tension on the by-pass valve need only be sufficient to withstand the pressure drop which exists through the screen, it will be evident that the spring loading would not be high enough to endanger the lubricating system in cold weather.

While but one specific embodiment of the device has been illustrated and described, it is to be understood that the invention is not limited to the exact details shown but that such modifications may be made as come within the scope of the appended claims.

I claim:

1. In a fluid pressure system, a stationary closed filter chamber, a pump for delivering fluid into said chamber under pressure, an operating pump element having a hollow shaft extension projected into said chamber, a hollow rotary element mounted on the shaft extension for rotation therewith and provided with a perforated wall through which the fluid passes under the pressure of said pump from the chamber to the interior of said hollow element, and then out the hollow shaft extension.

2. In a fluid pressure system, a stationary closed filter chamber, a pump for delivering fluid into said chamber under pressure, an operating pump element having a hollow shaft extension projected into said chamber, a hollow rotary element mounted on the shaft extension for rotation therewith and provided with a perforated wall to permit the passage of fluid under pressure therethru from the chamber to the interior of the hollow element, said rotary element being adapted to impart rotation to the fluid in the chamber whereby a filtering action is obtained thru centrifugal force and the relative velocity differential of the element and fluid.

3. In a fluid pressure system, a pump having a hollow shaft extension, a rotary hollow screen mounted for rotation on said shaft extension with said hollow shaft extension constituting an outlet leading from the interior thereof, a stationary closed chamber in which the screen is rotatable and into which said pump discharges fluid under pressure whereby the fluid tends to pass from the chamber thru the screen under pressure to the outlet and is given a rotary movement by its contact with the screen.

4. In a fluid pressure system, a pump, a rotary hollow screen having an outlet leading from the interior thereof, a drive connection between the pump and screen, a chamber in which the screen is rotatable and into which said pump discharges fluid under pressure, whereby the fluid under pressure tends to pass thru the screen to the outlet and is given a rotary movement by its contact with the screen, the inner wall of said chamber having a helical groove adapted to receive dirt particles thrown outwardly from the rotating fluid by centrifugal force and a recessed cap at one end of said chamber, a plate interposed between the cap and chamber and positioned over the recess to form a pocket, said plate having an opening therein at the end of said helical groove thru which the dirt particles pass into said pocket.

5. In a fluid pressure system, the combination with a gear pump comprising a driving and an idler gear, of a chamber having communication with the pressure side of said pump, a screen in said chamber fixedly secured on a hollow extension of one of the gears for rotation therewith said hollow extension constituting an outlet passageway from the chamber.

6. In a fluid pressure system, the combination with a gear pump comprising a driving and an idler gear of a chamber having communication with the pressure side of said pump, a screen in said chamber fixedly secured on a hollow extension of one of the gears for rotation therewith said hollow extension constituting an outlet passageway from the chamber, a by-pass around the chamber and a valve in said by-pass.

7. In a fluid pressure system, the combination with a gear pump comprising a driving and an idler gear of a chamber having communication with the pressure side of said pump, a screen in said chamber fixedly secured on a hollow extension of one of the gears for rotation therewith said hollow extension constituting an outlet passageway from the chamber, and a settling well associated with said chamber.

8. In a fluid pressure system, the combination with a gear pump comprising a driving and an idler gear of a chamber having communication with the pressure side of said pump, a screen in said chamber fixedly secured on a hollow extension of one of the gears for rotation therewith said hollow extension constituting an outlet passageway from the chamber, a settling well associated with the chamber, the wall of the chamber being provided with a helical groove leading to the well.

9. In a fluid pressure system the combination with a chamber, of means associated therewith for forcing fluid therethrough comprising a gear pump having a driving and an idler gear, a hollow extension on one of the gears projecting into the chamber and constituting an outlet therefrom a filter element carried by said extension through which the fluid must pass to reach said outlet, a helical rib on the wall of the chamber, a settling well provided at the end of the rib, and a removable drain plug for said well.

In testimony whereof I affix my signature.

LEROY W. SHUTTS.